(12) United States Patent
Takehara et al.

(10) Patent No.: US 10,513,189 B2
(45) Date of Patent: Dec. 24, 2019

(54) CHARGING SYSTEM AND CHARGER

(71) Applicants: Kabushiki Kaisha Toshiba, Minato-ku (JP); Toshiba Infrastructure Systems & Solutions Corporation, Kawasaki-shi (JP)

(72) Inventors: Jun Takehara, Setagaya (JP); Fumiyasu Miyoshi, Wako (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 128 days.

(21) Appl. No.: 15/756,259

(22) PCT Filed: Jul. 15, 2016

(86) PCT No.: PCT/JP2016/071064
§ 371 (c)(1),
(2) Date: Feb. 28, 2018

(87) PCT Pub. No.: WO2017/038277
PCT Pub. Date: Mar. 9, 2017

(65) Prior Publication Data
US 2018/0244163 A1  Aug. 30, 2018

(30) Foreign Application Priority Data

Sep. 1, 2015 (JP) .................................. 2015-172242

(51) Int. Cl.
*H01M 10/46* (2006.01)
*B60L 11/18* (2006.01)
(Continued)

(52) U.S. Cl.
CPC ............ *B60L 11/1809* (2013.01); *B60K 1/04* (2013.01); *G06Q 50/30* (2013.01); *B60L 2200/18* (2013.01); *B60Y 2200/91* (2013.01)

(58) Field of Classification Search
CPC . H02J 7/0052; H02J 7/007; H02J 7/04; B60L 11/1824; B60L 11/1825;
(Continued)

(56) References Cited

U.S. PATENT DOCUMENTS

2004/0104814 A1   6/2004   Christensen et al.
2008/0277173 A1   11/2008  Midrouillet et al.
(Continued)

FOREIGN PATENT DOCUMENTS

JP   2013-243922 A   12/2013
JP   2016-111778 A   6/2016
JP   2016-181965 A   10/2016

*Primary Examiner* — Edward Tso
(74) *Attorney, Agent, or Firm* — Oblon, McClelland, Maier & Neustadt, L.L.P.

(57) ABSTRACT

A charging system includes an electric bus and a charger. The charger includes a supply unit and a second communication unit. The supply unit supplies power to the electric bus stopped at a preset position. If power is being supplied to the electric bus by the supply unit, the second communication unit transmits a first identifier of the charger, if power is not being supplied to the electric bus by the supply unit, transmits a second identifier that is an identifier of the charger and different from the first identifier, and if a first command is received from the electric bus, transmits and receives information related to charging of a storage functional unit included in the electric bus, with the electric bus being a transmission source of the first command, using radio communication.

8 Claims, 4 Drawing Sheets

(51) Int. Cl.
 *G06Q 50/30* (2012.01)
 *B60K 1/04* (2019.01)
(58) Field of Classification Search
 CPC .............. B60L 11/1816; B60L 11/1833; Y02T 10/7072; Y02T 10/7005; Y02T 90/14; Y02T 90/121
 USPC .................. 320/104, 107, 108, 109, 114, 128
 See application file for complete search history.

(56) References Cited

U.S. PATENT DOCUMENTS

2009/0085522 A1\* 4/2009 Matsumoto ........... B60W 10/26
 320/137
2018/0072172 A1 3/2018 Takehara et al.

\* cited by examiner

| | CHARGER INFORMATION | | |
|---|---|---|---|
| CHARGING SPACE S1 | Charger1, CH1, Lane1 | Charger2, CH2, Lane2 | |
| CHARGING SPACE S2 | Charger4, CH4, Lane1 | | |
| CHARGING SPACE S3 | Charger5, CH1, Lane1 | | |
| CHARGING SPACE S4 | None | | |
| CHARGING SPACE S5 | Charger6, CH1, Lane1 | | |

CHARGING SYSTEM AND CHARGER

CROSS-REFERENCE TO RELATED APPLICATIONS

This application is national stage application of International Application No. PCT/JP2016/071064, filed Jul. 15, 2016, which designates the United States, incorporated herein by reference, and which claims the benefit of priority from Japanese Application No. 2015-172242, filed on Sep. 1, 2015, the entire contents of each of which are incorporated herein by reference.

FIELD

Embodiments described herein relate generally to a charging system and a charger.

BACKGROUND

For suppressing global warming and preparing for depletion of oil resources, an electric vehicle (EV) that travels by electric energy is introduced. In addition, also in a public transportation system such as a route bus, the introduction of the EV progresses. Meanwhile, the EV needs to charge a storage functional unit such as a rechargeable battery that is mounted in the EV. In the case of employing the EV as a route bus, there are a method of charging a storage functional unit once a day so that the route bus can travel for one day, a method of charging a storage functional unit by a charger provided at a terminal or a station, when the route bus stops at the terminal or the station, and the like.

According to the method of charging a storage functional unit of a route bus once a day, a size, cost, and weight of the storage functional unit that are required for storing power for the route bus traveling for one day increase. Thus, the method of frequently charging the storage functional unit while the route bus is stopped at a terminal or a station can save the size and the cost of the storage functional unit more. Furthermore, in this method, a travel distance of the route bus per unit power amount becomes longer due to the weight saving of the storage functional unit.

Nevertheless, the method of charging the storage functional unit while the route bus is stopped at a terminal or a station may decrease running efficiency of the route bus if a time required for charging becomes longer.

DETAILED DESCRIPTION

In general, an according to embodiments, a charging system includes an electric bus and a charger. The electric bus includes a storage functional unit, a drive unit, a charging unit, and a first communication unit. The drive unit drives the electric bus using power discharged from the storage functional unit. The charging unit charges the storage functional unit using power supplied from the charger. The first communication unit receives an identifier of the charger from the charger, and transmits a first command commanding a start of radio communication, to the charger identified by the received identifier. The charger includes a supply unit and a second communication unit. The supply unit supplies power to the electric bus stopped at a preset position. If power is being supplied to the electric bus by the supply unit, the second communication unit transmits a first identifier of the charger, if power is not being supplied to the electric bus by the supply unit, transmits a second identifier that is an identifier of the charger and different from the first identifier, and if the first command is received from the electric bus, transmits and receives information related to charging of the storage functional unit, with the electric bus being a transmission source of the first command, using radio communication. If the second identifier is received, the first communication unit prohibits transmission of the first command.

A charging system and a charger according to the present embodiment will be described below using the attached drawings.

First Embodiment

Figure 1:
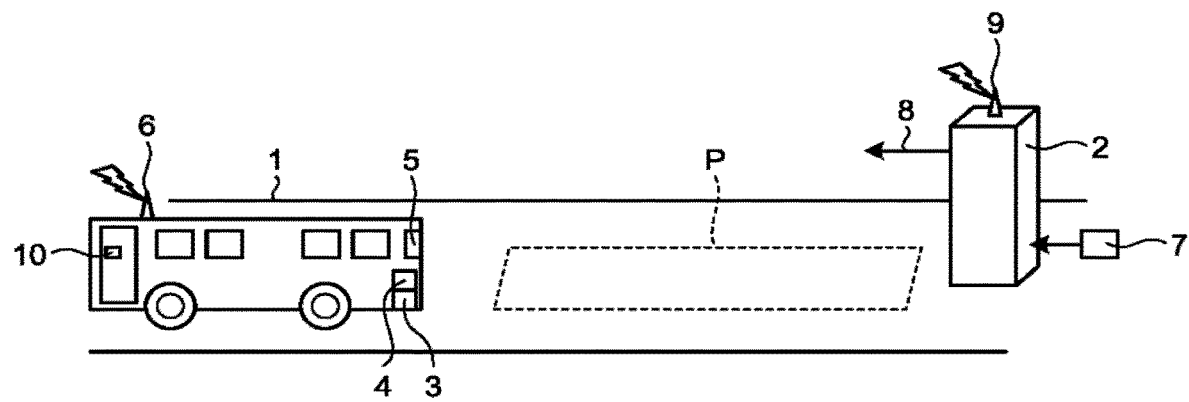
FIG. 1 is a diagram illustrating an example of a configuration of a charging system according to a first embodiment.

FIG. 1 is a diagram illustrating an example of a configuration of a charging system according to a first embodiment. As illustrated in FIG. 1, the charging system according to the present embodiment includes a route bus (EV: Electric Vehicle) 1 that travels using electric energy as driving power, and a charger 2 that is provided at a preset position (hereinafter, referred to as a charging point P) such as a terminal and a station of the route bus 1, and performs charging by supplying power to the route bus 1 stopped at the charging point P.

The route bus 1 includes a storage functional unit 3, a charge-discharge functional unit 4, a charging port 5, a route bus side communication unit 6, and an operation display unit 10. The operation display unit 10 is an operation unit that can input various operations to the route bus 1. In addition, the operation display unit 10 also functions as a display unit that displays various types of information to be notified to a driver of the route bus 1. The storage functional unit 3 is a rechargeable battery, a capacitor, or the like, and is charged using power received from an external device such as the charger 2, and discharges power when the route bus 1 is driven (e.g., at the time of traveling).

The charge-discharge functional unit 4 (an example of a charging unit) charges the storage functional unit 3 using power received from the external device by the charging port 5 to be described later. In addition, the charge-discharge functional unit 4 supplies power discharged from the storage functional unit 3, to a drive unit (not illustrated). Here, the drive unit drives the route bus 1 using the power discharged from the storage functional unit 3. In the present embodiment, the drive unit is a safety mechanism or an electric component that is included in a vehicle operated by a power converter, a motor, diesel engine, or the like, fare collection equipment that collects fares from passengers, the operation display unit 10, or the like.

The charging port 5 is a charging plate, for example, and is a power receiving unit that contacts a charging mechanism unit 8 included in the charger 2, to receive power supplied from the charger 2. In the present embodiment, the charging port 5 is provided on a roof of the route bus 1, and contacts the charging mechanism unit 8 having moved to an upper portion of the route bus 1 that is to be described later, and receives power supplied from the charger 2, via the charging mechanism unit 8.

The route bus side communication unit 6 (an example of a first communication unit) is a communication unit that performs communication with an external device such as the charger 2. In the present embodiment, the route bus side communication unit 6 transmits radio waves via an antenna (not illustrated), and performs radio communication with the charger 2 or the like.

The charger 2 has a function of receiving power supply from an external power generating device 7 such as a commercial power system, a power generator, and a solar power generator, and converting the supplied power into power for charging the route bus 1. In addition, the charger 2 includes the charging mechanism unit 8 (an example of a supply unit) that supplies power to the route bus 1 via the charging port 5, with being in contact with the charging port 5 of the route bus 1 stopped at the charging point P.

In the present embodiment, the charging mechanism unit 8 supplies power supplied from the external power generating device 7, to the route bus 1 via the charging port 5, with being in contact with the charging port 5 of the route bus 1. Nevertheless, the charging mechanism unit 8 is not limited to this as long as the charging mechanism unit 8 supplies power to the route bus 1 stopped at the charging point P. For example, the charging mechanism unit 8 may supply power supplied from the external power generating device 7, to the route bus 1, by a noncontact method using electromagnetic induction, magnetic resonance, or the like.

Furthermore, the charger 2 includes a charger side communication unit 9 (an example of a second communication unit) being a communication unit that communicates with an external device such as the route bus 1. In the present embodiment, the charger side communication unit 9 transmits radio waves via an antenna (not illustrated), and performs radio communication with the route bus 1 or the like. The route bus side communication unit 6 and the charger side communication unit 9 perform radio communication with each other, according to a wireless local area network (LAN) standard such as an Institute of Electrical and Electronic Engineers (IEEE) 802.11 standard, for example.

In the present embodiment, the route bus side communication unit 6 functions as a client of a wireless LAN, and the charger side communication unit 9 functions as an access point of the wireless LAN. In radio communication compliant with the wireless LAN standard, generally, an access point periodically transmits a service set identifier (SSID) being an example of an identifier for identifying the access point, for establishing radio communication. If a client receives the SSID transmitted from the access point, the client attempts to establish radio communication with the access point, by transmitting a connection request that includes the SSID and commands a start of radio communication, to the access point identified by the received SSID. If the access point receives a connection request including an SSID matching the SSID transmitted by itself, the access point responds whether radio communication can be performed, to the client being a transmission source of the connection request. Through the above processing, the access point and the client recognize existences of each other, and establish radio communication. After that, the access point and the client perform various types of processing such as authentication, and then perform transmission and reception of various types of information using radio communication.

Next, the description will be given of processing of establishing radio communication between the route bus 1 and the charger 2 in the charging system according to the present embodiment.

The charger side communication unit 9 of the charger 2 includes a storage unit (not illustrated) that stores two types of SSIDs that make the charger 2 identifiable, and are different from each other. Then, the charger side communication unit 9 transmits at least either one of the two types of SSIDs stored in the storage unit (not illustrated), according to a state of power supply to the route bus 1 by the charging mechanism unit 8. In the present embodiment, when transmitting an SSID, the charger side communication unit 9 transmits a beacon to which the SSID is added. After that, if the charger side communication unit 9 receives, from the route bus 1, a connection request including the SSID of the charger 2 itself, the charger side communication unit 9 establishes radio communication with the route bus 1 being a transmission source of the connection request, and transmits and receives information related to charging of the storage functional unit 3 (hereinafter, referred to as charging information). Here, the charging information is, for example, an electric parameter such as storage capacity of the storage functional unit 3 mounted in the route bus charging voltage, and current that can be flowed from the storage functional unit 3, a preset identification code or model name of the route bus 1, or a combination of these.

More specifically, if power is not being supplied to the route bus 1 by the charging mechanism unit 8, and the charger side communication unit 9 is on standby, the charger side communication unit 9 transmits a first SSID (an example of a first identifier): Charger1_A, and does not transmit a second SSID (an example of a second identifier): Charger1_NA different from the first SSID. Then, if the charger side communication unit 9 receives a connection request including the first SSID: Charger1_A of the charger 2 itself, the charger side communication unit 9 transmits a connection response to the route bus 1 being a transmission source of the connection request, and transmits and receives the charging information with the route bus 1 using radio communication.

In addition, if power is being supplied to the route bus 1 by the charging mechanism unit 8, the charger side communication unit 9 transmits the second SSID: Charger1_NA, and does not transmit the first SSID: Charger1_A. Then, if the charger side communication unit 9 receives a connection request including the second SSID: Charger1_NA of the charger 2 itself, the charger side communication unit 9 does not transmit a connection response to the route bus 1 being a transmission source of the connection request.

In addition, if the charging mechanism unit 8 cannot supply power to the route bus 1 because the charging mechanism unit 9 is out of order, under maintenance, or the like, the charger side communication unit 9 transmits both of the first SSID: Charger1_A and the second SSID: Charger1_NA. Then, if the charger side communication unit 9 receives a connection request including the first SSID: Charger1_A or the second SSID: Charger1_NA of the charger itself, the charger side communication unit 9 transmits a connection response to the route bus 1 being a transmission source of the connection request, and transmits and receives the charging information with the route bus 1 using radio communication.

On the other hand, if the route bus 1 gets close to the charging point P, and receives an SSID, the route bus side communication unit 6 of the route bus 1 attempts to establish radio communication with the charger 2 by transmitting a connection request to the charger 2 identified by the received SSID. After that, if radio communication with the charger 2 is established, the route bus side communication unit 6 transmits and receives charging information with the charger 2.

More specifically, if the route bus side communication unit 6 receives the first SSID, and does not receive the second SSID, the route bus side communication unit 6 determines that the charger 2 is normal, and on standby. Then, the route bus side communication unit 6 establishes radio communication with the charger 2 by transmitting, to the charger 2 identified by the first SSID: Charger1_A, a connection request including the first SSID: Charger1_A, and transmits and receives charging information with the charger 2.

In addition, if the route bus side communication unit 6 receives the second SSID, and does not receive the first SSID, the route bus side communication unit 6 determines that the charger 2 is normal, and is charging. Then, the route bus side communication unit 6 prohibits transmission of a connection request to the charger 2 identified by the second SSID: Charger1_NA. Nevertheless, the route bus side communication unit 6 cancels prohibition of a connection request if the transmission of a connection request is commanded by a driver via the operation display unit 10, or if a remaining amount of the storage functional unit 3 is a predetermined amount or less. Then, the route bus side communication unit 6 establishes radio communication with the charger 2 by transmitting, to the charger 2, a connection request including the second SSID: Charger1_NA, and transmits and receives charging information with the charger 2.

In addition, if the route bus side communication unit 6 receives both of the first SSID and the second SSID, the route bus side communication unit 6 determines that the charger 2 is in a state of being unable to supply power to the route bus 1. Then, the route bus side communication unit 6 prohibits transmission of a connection request to the charger 2 identified by the first SSID: Charger1_A or the second SSID: Charger1_NA.

In this manner, the bus side communication unit 6 can identify whether the charger 2 can charge the storage functional unit 3, without establishing radio communication with the charger 2, and transmitting and receiving charging information. Thus, if the charger cannot charge the storage functional unit 3, it can be promptly determined to head for another charging point P, without performing unnecessary radio communication.

As mentioned above, if the route bus side communication unit 6 receives the first SSID, and does not receive the second SSID, the route bus side communication unit 6 performs transmission and reception of charging information using radio communication, for starting charging of the storage functional unit 3. In addition, if the route bus side communication unit 6 receives the second SSID, and does not receive the first SSID, the route bus side communication unit 6 may display, on the operation display unit 10, a message prompting the driver to stand by until charging by the charger 2 ends, or to head for another charging point P. In addition, if the route bus side communication unit 6 receives both of the first SSID and the second SSID, the route bus side communication unit 6 may display, on the operation display unit 10, a message prompting the driver to head for another charging point P.

Meanwhile, for charging the route bus 1 while passengers are getting on and off at a terminal, a station, or the like, charging of the route bus 1 needs to be performed in a short time. Nevertheless, for performing charging of the route bus 1, advance preparation processing of confirming normality of the charger 2 such as whether the charger 2 can perform charging, before power is supplied from the charger 2 to the route bus 1, charging processing of supplying power from the charger 2 to the route bus 1, end processing of shifting to a state in which the route bus 1 is travelable, after the end of charging of the route bus 1, and the like need to be performed, and a time of the charging processing may fail to be sufficiently secured.

Thus, for sufficiently securing a time of the charging processing, the advance preparation processing is preferably executed before the route bus 1 arrives at a terminal, a station, or the like. Nevertheless, because the route bus 1 is a movable body, for executing the advance preparation processing before the route bus 1 arrives at a terminal, a station, or the like, confirmation information indicating whether the charger 2 can perform charging needs to be exchanged with the charger 2 using radio communication. Nevertheless, if the route bus 1 starts radio communication by getting close to a terminal, a station, or the like, normally, the route bus 1 receives an SSID of the charger 2, establishes radio communication with the charger 2 by transmitting a connection command for commanding radio communication, to the charger 2 identified by the received SSID, and then, exchanges the confirmation information. Thus, a time required for charging becomes longer due to the time of the advance preparation processing, and this declines running efficiency of the route bus 1.

In contrast to this, according to the charging system according to the first embodiment, whether the charger 2 can perform charging can be identified by a low layer of radio communication (transmission and reception of the beacon to which an SSID is added). With this configuration, the charger 2 that can perform charging can be found, without establishing radio communication of a higher layer (transmission and reception of charging information) between the route bus 1 and the charger 2, and exchanging the confirmation information (i.e., without executing the advance preparation processing). Thus, a time required for charging can be shortened, and running efficiency of the route bus 1 can be enhanced.

In addition, if the route bus side communication unit 6 misrecognises that only either one of the first SSID and the second SSID is received, even though the first SSID and the second SSID are transmitted, and a connection request is transmitted, the charger side communication unit 9 of the charger 2 establishes radio communication with the route bus 1 by transmitting a connection response to the route bus 1 being a transmission source of the connection request, and transmits, to the route bus 1, a message notifying that the charger 2 cannot be used.

Furthermore, if the charger side communication unit 9 gets out of order, the route bus side communication unit 6 of the route bus 1 can receive neither the first SSID nor the second SSID even if getting close to the charging point P. In this case, the route bus side communication unit 6 cannot recognize existence of the charger side communication unit 9. Thus, the route bus side communication unit 6 transmits an SSID being an identifier of the route bus 1, and waits for a response from the charger 2. If the route bus side communication unit 6 does not receive a response from the charger 2 until a predetermined time elapses from when the transmission of the SSID is started, the route bus side communication unit 6 determines that the charger side communication unit 9 is out of order, and displays, on the operation display unit 10, a message prompting the driver to heard for another charging point P.

Second Embodiment

The present embodiment is an example of transmitting an SSID different from an SSID transmitted from another charger having an at least partially-overlapping range in which communication can be performed using radio communication. In the following description, the description of parts similar to the first embodiment will be omitted.

In the present embodiment, in addition to the storage functional unit 3, the charge-discharge functional unit 4, the charging port 5, and the operation display unit 10, the route bus 1 includes a route bus side communication unit 6 different from that in the first embodiment. In addition, the charger 2 includes a charger side communication unit 9 different from that in the first embodiment, in addition to the charging mechanism unit 8.

Figure 2:
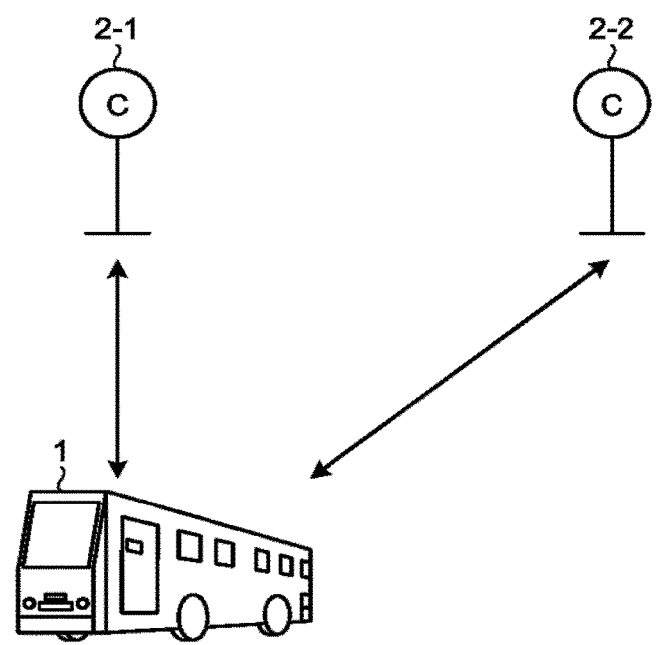
FIG. 2 is a diagram illustrating an example in which a plurality of chargers is adjacently arranged in a charging system according to a second embodiment.
Figure 3:
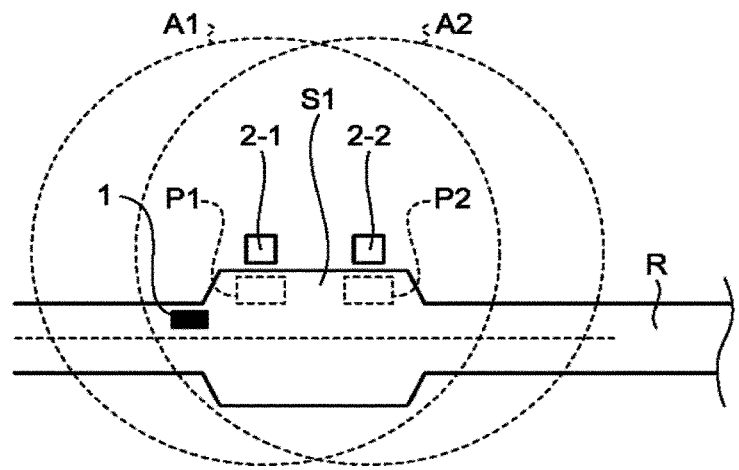
FIG. 3 is an overhead view of a charging space in which the plurality of chargers is adjacently arranged in the charging system according to the second embodiment.

FIG. 2 is a diagram illustrating an example in which a plurality of chargers is adjacently arranged in a charging system according to a second embodiment. FIG. 3 is an overhead view of a charging space in which the plurality of chargers is adjacently arranged in the charging system according to the second embodiment. As illustrated in FIGS. 2 and 3, in the present embodiment, the charging system includes adjacently-arranged two chargers 2-1 and 2-2. The charger 2-1 has a charging point P1 at a position in a charging space S1, such as a position on a road surface R of a road, and a position adjacent to a road, the position being near the charger 2-1, and performs charging of the route bus 1 stopped at the charging point P1. In addition, the charger 2-2 has a charging point P2 at a position in the charging space S1, the position being near the charger 2-2, and performs charging of the route bus 1 stopped at the charging point P2.

In addition, the charger side communication unit 9 included in the charger 2-1 has a radio communication-available range A1 (hereinafter, referred to as a first radio communication-available area). In addition, the charger side communication unit 9 included in the charger 2-2 has a radio communication-available range A2 (hereinafter, referred to as a second radio communication-available area). Then, the first radio communication-available area A1 and the second radio communication-available area A2 partially overlap. In the present embodiment, the first radio communication-available area A1 and the second radio communication-available area A2 partially overlap. Nevertheless, the overlap is not limited to this as long as the first radio communication-available area A1 and the second radio communication-available area A2 overlap at least partially. For example, the first radio communication-available area A1 and the second radio communication-available area A2 may totally overlap.

Then, the charger side communication unit 9 of the charger 2-1 transmits a first SSID: Charger1_A and a second SSID: Charger1_NA being different from SSIDs transmitted by the charger side communication unit 9 of the charger 2-2. In addition, the charger side communication unit 9 of the charger 2-2 transmits a first SSID: Charger2_A and a second SSID: Charger2_NA being different from the SSIDs transmitted by the charger side communication unit 9 of the charger 2-1.

In the present embodiment, because the first radio communication-available area A1 and the second radio communication-available area A2 partially overlap, as illustrated in FIG. 3, if the route bus 1 enters a position at which the first radio communication-available area A1 and the second radio communication-available area A2 overlap, the route bus side communication unit 6 of the route bus 1 receives all or part of the first SSID and the second SSID transmitted from the charger 2-1, and the first SSID and the second SSID transmitted from the charger 2-2.

As mentioned above, the chargers 2-1 and 2-2 transmit the first SSIDs or the second SSIDs different from each other. Thus, based on the first SSIDs or the second SSIDs respectively received from the two chargers 2-1 and 2-2, the route bus side communication unit 6 can identify from which charger 2 of the two chargers 2-1 and 2-2 the first SSID or the second SSID is received.

Then, the route bus side communication unit 6 transmits a connection request to the charger 2 identified by the received first SSID, to establish radio communication with the charger 2. With this configuration, if the plurality of chargers 2-1 and 2-2 is adjacently arranged, the charger 2 being normal and on standby, out of the plurality of chargers 2-1 and 2-2, can be identified without performing radio communication with each of the plurality of chargers 2-1 and 2-2. Thus, a procedure of starting charging of the route bus 1 can be promptly started.

In addition, the route bus side communication unit 6 can also transmit a connection request to the charger 2 identified by the received second SSID. Nevertheless, as mentioned above, it is preferable to transmit a connection request to the charger 2 identified by the received first SSID. For example, if the charger 2-1 or the charger 2-2 is charging or out of order, the route bus side communication unit 6 receives the second SSID. The route bus side communication unit 6 therefore prohibits transmission of a connection request to the charger 2 identified by the second SSID. With this configuration, because radio communication is not performed with the charger 2 being charging or out of order, a time required for radio communication with the chargers 2-1 and 2-2 can be saved.

In addition, if both of the received SSIDs are the second SSIDs, and both of the chargers 2-1 and 2-2 are charging or out of order, the route bus side communication unit 6 may display, on the operation display unit 10, a message prompting the driver to cause the route bus 1 to stand by until the first SSID is received, or a message prompting the driver to move to the next charging space.

In this manner, according to the charging system of the second embodiment, if a plurality of chargers 2 is adjacently arranged, a charger 2 being normal and on standby, out of the plurality of chargers 2, can be identified without performing radio communication with each of the plurality of chargers 2. Thus, a procedure of starting charging of the route bus 1 can be promptly started.

Third Embodiment

The present embodiment is an example of including a storage unit that stores position at which a route bus stops in a travel route of the route bus, and charger information related to a charger that can charge a route bus stopped at the position, in association with each other. In the following description, the description of parts similar to the aforementioned embodiments will be omitted.

Also in the present embodiment, in addition to the storage functional unit 3, the charge-discharge functional unit 4, the charging port 5, and the operation display unit 10, the route bus 1 includes a route bus side communication unit 6 different from that in the first embodiment. In addition, the charger 2 includes a charger side communication unit 9 different from that in the first embodiment, in addition to the charging mechanism unit 8.

Figure 4:
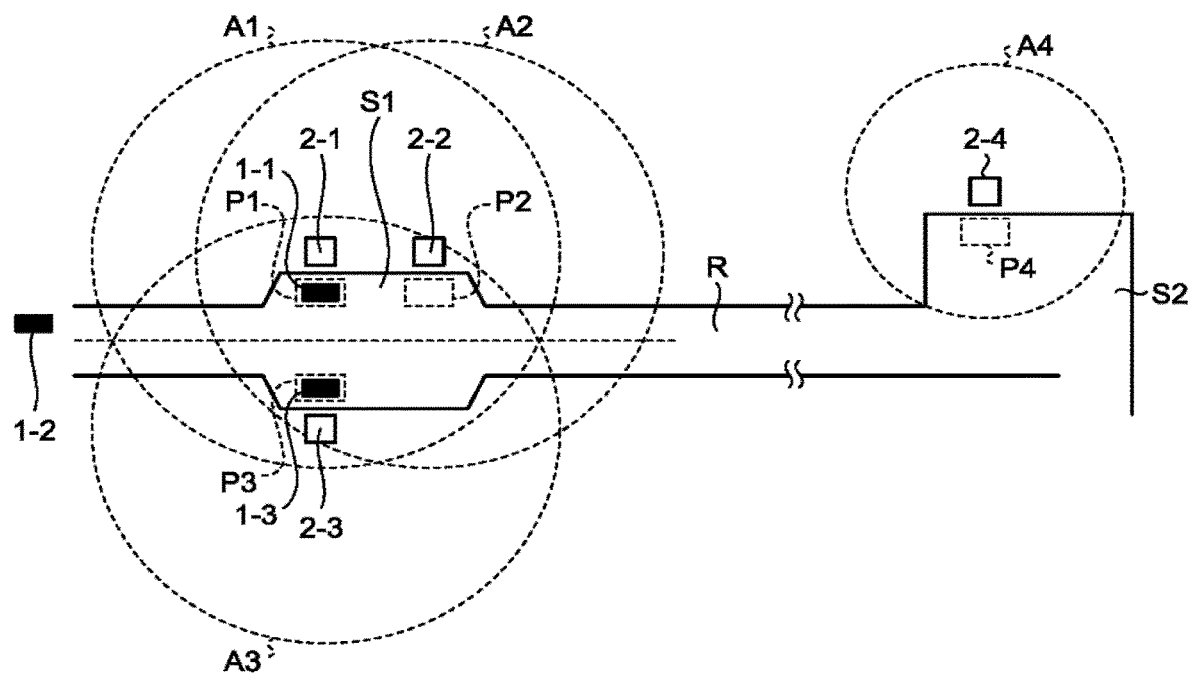
FIG. 4 is an overhead view of a charging space in which a plurality of chargers is adjacently arranged in a charging system according to a third embodiment.
Figures 5, 6:
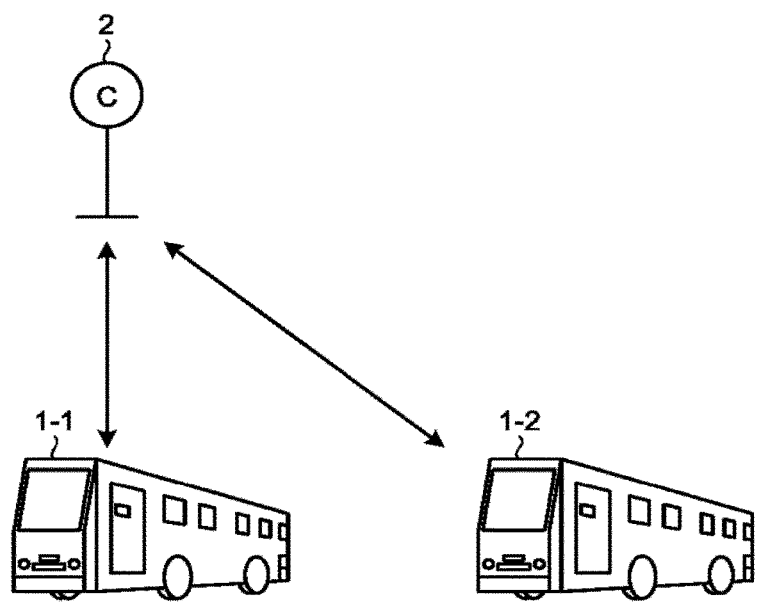
FIG. 5 is a diagram illustrating an example of a charger ID table stored by a route bus of the charging system according to the third embodiment.
FIG. 6 is a diagram for illustrating an example of transmission processing of reservation information in a charging system according to a fourth embodiment.

FIG. 4 is an overhead view of a charging space in which a plurality of chargers is adjacently arranged in a charging system according to a third embodiment. FIG. 5 is a diagram illustrating an example of a charger ID table stored by a route bus of the charging system according to the third embodiment. As illustrated in FIG. 4, in the present embodiment, in the charging system, a charger 2-3 is adjacently arranged in addition to the chargers 2-1 and 2-2. The charger 2-3 has a charging point P3 at a position in the charging space S1, the position being near the charger 2-3, and performs charging of the route bus 1 stopped at the charging point P3.

In addition, as illustrated in FIG. 4, in the present embodiment, in the charging system, a charger 2-4 is arranged at a position distant from the chargers 2-1, 2-2, and 2-3. The charger 2-4 has a charging point P4 at a position in a charging space S2 distant from the charging space S1, such as a position on a road surface R of a road, and a position adjacent to a road, the position being near the charger 2-4, and performs charging of the route bus 1 stopped at the charging point P4.

In addition, the charger side communication unit 9 included in the charger 2-3 has a radio communication-available range A3 (hereinafter, referred to as a third radio communication-available area). The third radio communication-available area A3 partially overlaps the first radio communication-available area A1 and the second radio communication-available area A2. Then, the charger side communication unit 9 included in the charger 2-3 transmits a first SSID: Charger3_A and a second SSID: Charger3_NA being different from the SSIDs transmitted by the charger side communication units 9 of the chargers 2-1 and 2-2.

In addition, the charger side communication unit 9 included in the charger 2-4 has a radio communication-available range A4 (hereinafter, referred to as a fourth radio communication-available area). The fourth radio communication-available area A4 overlaps none of the first radio communication-available area A1, the second radio communication-available area A2, and the third radio communication-available area A3. Nevertheless, in the present embodiment, the charger side communication unit 9 included in the charger 2-4 transmits a first SSID: Charger4_A and a second SSID: Charger4_NA being different from the SSIDs transmitted by the charger side communication units 9 of the chargers 2-1, 2-2, and 2-3.

In the present embodiment, as illustrated in FIG. 5, the route bus side communication unit of the route bus 1 includes the storage unit that stores a charger ID table T that associates charging spaces S1 to S5 being positions at which the route bus 1 stops in a route traveled by the route bus 1 (hereinafter, referred to as a bus running route), and charger information (an example of first information) related to chargers 2 that can charge the route bus 1 at the charging spaces S1 to S5. Here, the charger ID table T stores the charging spaces S at which the route bus 1 stops in the bus running route, in an order in which the route bus 1 stops. In addition, the charger information includes a charger ID of the charger 2, a channel used for radio communication by the charger side communication unit 9 of the charger 2, and a lane on which the charging point P of the charger 2 is installed.

For example, in the charger ID table T, the charging space S1 at which the route bus 1 firstly stops in the bus running route is associated with charger information of each of the two chargers 2-1 and 2-2 provided in the charging space S1. The charger information of the charger 2-1 includes a charger ID: Charger1 of the charger 2-1, a channel: CH1 used for radio communication by the charger side communication unit 9 of the charger 2-1, and a lane: Lane1 on which the charging point P1 of the charger 2-1 is installed. In addition, the charger information of the charger 2-2 includes a charger ID: Charger2 of the charger 2-2, a channel: CH2 used for radio communication by the charger side communication unit 9 of the charger 2-2, and a lane: Lane2 on which the charging point P2 of the charger 2-2 is installed.

In addition, the charging point P3 of the charger 2-3 is provided in the charging space S1, but the charging point P3 is provided on a lane on an opposite side of a lane on which the route bus 1 travels when firstly stopping. Thus, in the charger ID table T, the first charging space S1 is not associated with device identification information of the charger 2-3 provided at the charging point P3.

In addition, in the charger ID table T, the charging space S2 at which the route bus 1 secondly stops in the bus running route is associated with charger information of the one charger 2-4 provided in the charging space S2. The charger information of the charger 2-4 includes a charger ID: Charger4 of the charger 2-4, a channel: CH4 used for radio communication by the charger side communication unit 9 of the charger 2-4, and a lane: Lane1 on which the charging point P4 of the charger 2-4 is installed. In addition, because no charger 2 is provided in the charging space S4 at which the route bus 1 fourthly stops in the bus running route, the fourth charging space S is not associated with charger information in the charger ID table T.

Also in the present embodiment, the charger side communication unit 9 of the charger 2 transmits at least one of the first SSID and the second SSID different from SSIDs transmitted by another charger 2 having an at least-partially overlapping range in which the charger side communication unit 9 can perform radio communication. For example, the charger side communication unit 9 of the charger 2-1 can transmit at least one of the first SSID: Charger1_A and the second SSID: Charger1_NA. In addition, the charger side communication unit 9 of the charger 2-2 can transmit at least one of the first SSID: Charger2_A and the second SSID: Charger2_NA. In addition, the charger side communication unit 9 of the charger 2-3 can transmit at least one of the first SSID: Charger3_A and the second SSID: Charger3_NA. In addition, the charger side communication unit 9 of the charger 2-4 can transmit at least one of the first SSID: Charger4_A and the second SSID: Charger4_NA.

If an ordinal number of a charging space S at which the route bus 1 is caused to stop next is input using the operation display unit 10, before the route bus 1 gets close to the charging space S, the route bus side communication unit 6 reads out, from the charger ID table T, charger information stored in association with the charging space S of the input ordinal number. Then, referring to the read charger information, the route bus side communication unit 6 changes various profiles, such as a channel used for radio communication with the charger and an SSID to which a connection request is to be transmitted, among SSIDs received from the charger 2.

For example, if the first is input from the operation display unit 10 as an ordinal number of a charging space S at which the route bus 1 is caused to stop next, the route bus side communication unit 6 reads out, from the charger ID table T, charger information (e.g., charger IDs: Charger1, Charger2, channels: CH1, CH6, lanes: Lane1, Lane2) associated with the first charging space S1. Then, the route bus side communication unit 6 changes a channel used for radio communication with the charger 2, to CH1, CH6, according to the channels read as the charger information. Furthermore, based on the charger IDs: Charger1, Charger2 read as the charger information, the route bus side communication unit 6 sets SSIDs of chargers 2 with which radio communication is to be performed, to Charger1_A, Charger1_NA, Charger2_A, and Charger2_NA. Then, the route bus side communication unit 6 transmits a connection request to the chargers 2 identified by the set SSIDs.

In the present embodiment, the route bus side communication unit 6 changes a channel used for radio communication with the charger 2, and sets the SSID of the charger 2 that performs radio communication, according to the input of the ordinal number from the operation display unit 10. Alternatively, the route bus side communication unit 6 may change a channel used for radio communication with the charger 2, and set the SSID of the charger 2 that performs radio communication, when charging of the route bus 1 is completed at a charging space S one space before, when a position of the route bus 1 that is detected by the Global Positioning System (GPS) gets close to the charging space S.

Here, as illustrated in FIG. 4, because the charger 2-1 is charging a route bus 1-1 stopped at the charging point P1, the charger side communication unit 9 of the charger 2-1 transmits the second SSID: Charger1_NA. On the other hand, because the route bus 1 is not stopped at the charging point P2, and the charger 2-2 is on standby, the charger side communication unit 9 of the charger 2-2 transmits the first SSID: Charger1_A. In addition, because the charger 2-3 is charging a route bus 1-3 stopped at the charging point P3, the charger side communication unit 9 of the charger 2-3 transmits the second SSID: Charger3_NA.

Thus, as illustrated in FIG. 4, if a route bus 1-2 gets close to the charging space S1, the route bus side communication unit 6 of the route bus 1-2 receives the second SSID transmitted from the charger 2-1, the first SSID transmitted from the charger 2-2, and the second SSID transmitted from the charger 2-3. Nevertheless, the SSID transmitted from the charger 2-3 is not included in the SSIDs: Charger1_A, Charger1_NA, Charger2_A, and Charger2_NA of the chargers 2 that perform radio communication. Thus, the route bus side communication unit 6 of the route bus 1-2 discards the SSID transmitted from the charger 2-3.

In addition, because the route bus side communication unit 6 of the route bus 1-2 receives the second SSID from the charger 2-1, the route bus side communication unit 6 determines that the charger 2-1 is normal and charging, and prohibits transmission of a connection request to the charger 2-1 identified by the second SSID. On the other hand, because the route bus side communication unit 6 of the route bus 1-2 receives the first SSID from the charger 2-2, the route bus side communication unit 6 determines that the charger 2-2 is normal and charging, and transmits a connection request to the charger 2-2 identified by the first SSID, to establish radio communication with the charger 2-2. In addition, when radio communication with the charger 2-2 is established, and transmission and reception of charging information with the charger 2-2 is started, the route bus side communication unit 6 of the route bus 1-2 may display, on the operation display unit 10, a message prompting the driver to cause the route bus 1 to stop at the charging point P2 of the charger 2-2.

In addition, as illustrated in FIG. 4, because the route bus 1-2 does not enter the fourth radio communication-available area A4 even if the route bus 1-2 gets close to the charging space S1, the route bus side communication unit 6 of the route bus 1-2 does not receive the SSID transmitted from the charger 2-4. Even if the route bus side communication unit 6 of the route bus 1-2 receives the SSID transmitted from the charger 2-4, because the SSID is not included in the SSIDs: Charger1_A, Charger1_NA, Charger2_A, and Charger2_NA of the chargers 2 that perform radio communication, the route bus side communication unit 6 discards the SSID transmitted from the charger 2-4.

In this manner, according to the charging system according to the third embodiment, when the route bus 1 gets close to a charging space S, an SSID of a charger 2 that performs radio communication is preset. With this configuration, if there is a plurality of charging points P in a charging space S at which a route bus 1 is to stop, radio communication can be promptly performed with a charger 2 provided at an appropriate charging point P. In other words, the number of chargers 2 being radio communication targets is reduced, and a time required for establishing radio communication between the route bus 1 and the chargers 2 can be shortened. Thus, a time required for charging can be shortened, and running efficiency of the route bus 1 can be enhanced.

Fourth Embodiment

The present embodiment is an example of transmitting, if the second SSID is received, and a charging reservation command (an example of a second command) commanding charging of a route bus is input, reservation information (an example of second information) commanding reservation of charging of the storage functional unit 3, to a charger. In the following description, the description of parts similar to the aforementioned embodiments will be omitted.

Also in the present embodiment, the route bus 1 includes the storage functional unit 3, the charge-discharge functional unit 4, the charging port 5, the route bus side communication unit 6, and the operation display unit 10. In addition, the charger 2 includes a charger side communication unit 9 different from that in the first embodiment, in addition to the charging mechanism unit 8.

FIG. 6 is a diagram for illustrating an example of transmission processing of reservation information in a charging system according to the fourth embodiment. As illustrated in FIG. 6, if the charger 2 is supplying power to the storage functional unit 3 of the route bus 1-1, the charger side communication unit 9 of the charger 2 transmits the second SSID. If the route bus 1-2 enters the first radio communication-available area A1, the route bus side communication unit 6 of the route bus 1-2 receives the second SSID transmitted from the charger 2. Then, if the route bus side communication unit 6 of the route bus 1-2 receives the second SSID from the charger 2, the route bus side communication unit 6 determines that the charger 2 is normal and charging, and prohibits transmission of a connection request to the charger 2 identified by the second SSID. At this time, if the driver of the route bus 1-2 operates an operation display unit 10 to input a message (an example of a second command) commanding charging of the storage functional unit 3 of the route bus 1-2, the route bus side communication unit 6 of the route bus 1-2 transmits, to the charger 2, reservation information (an example of second information) commanding reservation of charging of the storage functional unit 3. In the present embodiment, the reservation information includes an SSID that makes the route bus 1 identifiable.

The charger side communication unit 9 of the charger 2 includes a storage unit (not illustrated) that receives reservation information from the route bus 1, and stores the received reservation information in the order of reception. With this configuration, based on reservation information stored in the storage unit (not illustrated), the charger side communication unit 9 can identify the number of route buses 1 that are waiting for charging. In addition, the charger side communication unit 9 counts the number of reservations being the number of pieces of reservation information stored in the storage unit (not illustrated), and if the counted number of reservations reaches a preset upper limit of the number of reservations, the charger side communication unit 9 refuses the reception of new reservation information. With this configuration, concentration of charging reservation on a specific charger 2 can be avoided.

In this manner, according to the charging system according to the fourth embodiment, the number of route buses 1 that are waiting for charging can be identified based on reservation information transmitted from the route bus 1.

Fifth Embodiment

The present embodiment is an example in which a route bus includes an imaging unit provided to be able to image the periphery of a charger, and an acquisition unit that acquires an SSID of the charger from an image obtained by imaging of the imaging unit, and if the SSID acquired by the acquisition unit, and a received SSID match, a route bus side communication unit transmits a connection request to the charger. In the following description, the description of parts similar to the aforementioned embodiments will be omitted.

Figure 7:
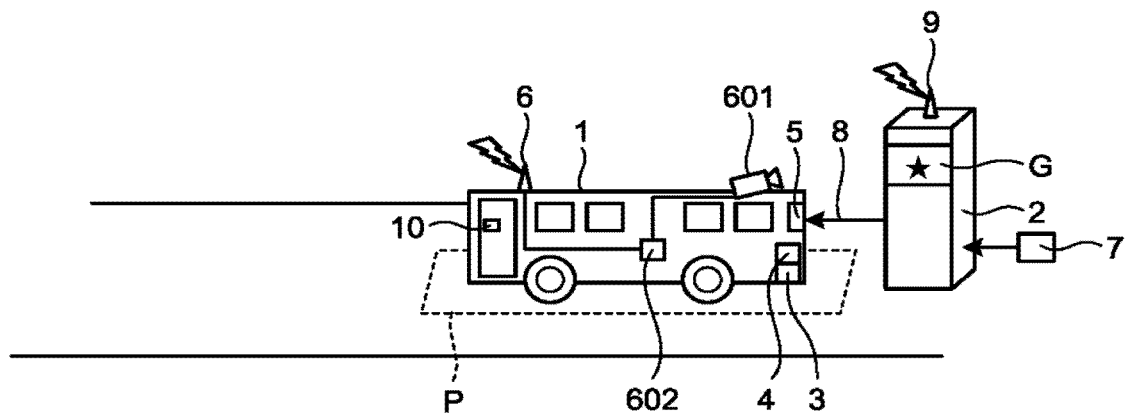
FIG. 7 is a diagram illustrating an example of a configuration of a charging system according to a fifth embodiment.

FIG. 7 is a diagram illustrating an example of a configuration of a charging system according to a fifth embodiment. As illustrated in FIG. 7, in the present embodiment, the route bus 1 includes a camera 601 (an example of the imaging unit) provided to be able to image the periphery of the charger 2, and an acquisition unit 602 that acquires an SSID of the charger 2 from an image obtained by imaging of the camera 601. In addition, at a position where the camera 601 of the route bus 1 can perform imaging in the periphery of the charger 2 (or, the charging point P of the charger 2), the charger 2 displays an image G representing an SSID of the charger 2 (hereinafter, referred to as an ID image. For example, an image representing an SSID by color, graphics, characters, or the like).

The acquisition unit 602 of the route bus 1 detects the ID image G from images obtained by imaging of the camera 601. Then, if the ID image G is detected, the acquisition unit 602 acquires an SSID from the detected ID image G. In the present embodiment, the acquisition unit 602 acquires an SSID from the ID image G. Nevertheless, if the charger 2 has a Radio Frequency Identifier (RFID) tag storing an SSID of the charger 2 itself, the acquisition unit 602 may acquire the SSID of the charger 2 from the RFID tag.

The route bus side communication unit 6 determines whether the SSID acquired by the acquisition unit 602, and a received SSID match. Here, if the SSID acquired by the acquisition unit 602, and the received SSID do not match, the operation display unit 10 (an example of a notification unit) displays (notifies) a message indicating that the charging point P being a stop position at which the route bus 1 is stopped is wrong, and prompts the driver to move the route bus 1.

On the other hand, if the SSID acquired by the acquisition unit 602, and the received SSID match, the route bus side communication unit 6 detects that the route bus 1 is stopped at a correct charging point P, and transmits a connection request to the charger 2 identified by the received SSID. In addition, the operation display unit 10 counts an elapsed time from when the SSID is received, and if an SSID is not acquired by the acquisition unit 602 even though the counted elapsed time exceeds a predetermined time, the operation display unit 10 detects that the charging point P at which the route bus 1 is stopped is wrong, and displays a message prompting the driver to move the route bus 1.

In this manner, according to the charging system according to the fifth embodiment, it can be confirmed whether the charger 2 performing radio communication, and the charger 2 provided at the charging point P at which the route bus 1 is stopped match. Thus, the driver of the route bus 1 can cause the route bus 1 to stop at a correct charging point P.

As described above, according to the first to fifth embodiments, a time required for charging can be shortened, and running efficiency of the route bus 1 can be enhanced.

Several embodiments of the present invention have been described, but these embodiments are presented as examples, and are not intended to limit the scope of the invention. These novel embodiments can be implemented in other various forms, and various omissions, substitutions, and modifications can be performed without departing from the gist of the invention. The embodiments and modifications thereof are included in the scope and gist of the invention, and are included in the invention described in Claims, and a scope equivalent thereto.

The invention claimed is:

1. A charging system comprising: an electric bus; and a charger,
    wherein the electric bus includes:
    a storage functional unit;
    a drive unit configured to drive the electric bus using power discharged from the storage functional unit;
    a charging unit configured to charge the storage functional unit using power supplied from the charger; and
    a first communication unit configured to receive an identifier of the charger from the charger, and transmit a first command commanding a start of radio communication, to the charger identified by the received identifier,
    wherein the charger includes:
    a supply unit configured to supply power to the electric bus stopped at a preset position; and
    a second communication unit configured, if power is being supplied to the electric bus by the supply unit, to transmit a first identifier of the charger, if power is not being supplied to the electric bus by the supply unit, to transmit a second identifier that is an identifier of the charger and different from the first identifier, and if the first command is received from the electric bus, to transmit and receive information related to charging of the storage functional unit, with the electric bus being a transmission source of the first command, using radio communication, and
    wherein, if the second identifier is received, the first communication unit prohibits transmission of the first command.

2. The charging system according to claim 1,
wherein, if power cannot be supplied to the electric bus by the supply unit, the second communication unit transmits both of the first identifier and the second identifier, and
wherein, if both of the first identifier and the second identifier are received, the first communication unit determines that the charger is unusable.

3. The charging system according to claim 1, wherein the second communication unit transmits the first identifier and the second identifier that are different from identifiers of other charger having an at least partially-overlapping range in which communication can be performed using radio communication.

4. The charging system according to claim 1,
wherein the electric bus includes a storage configured to store a position at which the electric bus stops in a travel route of the electric bus, and first information related to the charger that charges the electric bus stopped at the position, in association with each other, and
wherein the first communication unit sets an identifier of the charger that performs radio communication, based on the first information stored in the storage in association with a position at which the electric bus stops next, and transmits the first command to the charger identified by the set identifier.

5. The charging system according to claim 1,
wherein, if the second identifier is received, and a second command commanding charging of the electric bus is input, the first communication unit transmits, to the charger, second information commanding reservation of charging of the storage functional unit, and
wherein the second communication unit includes a storage configured to store the second information received from the electric bus.

6. The charging system according to claim 1,
wherein the electric bus includes:
an imaging unit configured to image a periphery of the charger, and
an acquisition unit configured to acquire an identifier of the charger from an image obtained by imaging of the imaging unit, and
wherein, if an identifier acquired by the acquisition unit, and a received identifier match, the first communication unit transmits the first command to the charger.

7. The charging system according to claim 6,
wherein the electric bus includes
a notification unit configured to notify a driver of the electric bus that a stop position of the electric bus is wrong, if an identifier acquired by the acquisition unit, and a received identifier do not match.

8. A charger comprising:
a supply unit configured to supply power to an electric bus stopped at a preset position; and
a second communication unit configured, if power is being supplied to the electric bus by the supply unit, to transmit a first identifier of the charger, if power is not being supplied to the electric bus by the supply unit, to transmit a second identifier that is an identifier of the charger and different from the first identifier, and if a first command commanding a start of radio communication is received from the electric bus, to transmit and receive information related to charging of a storage functional unit included in the electric bus, with the electric bus being a transmission source of the first command, using radio communication.

* * * * *